Patented Feb. 27, 1940

2,191,853

UNITED STATES PATENT OFFICE 2,191,853

USE OF SYNTHETIC RESINS

Eric Leighton Holmes, Teddington, England

No Drawing. Application February 15, 1937, Serial No. 125,896. In Great Britain February 24, 1936

6 Claims. (Cl. 252—2)

This invention relates to the use of synthetic resins.

British specification No. 450,308 describes and claims processes of treating liquids with synthetic resins obtained by the condensation of polyhydric phenols or their derivatives or tannins alone or in association with monohydric phenols or their derivatives with formaldehyde or an equivalent methylene body to effect absorption or adsorption of particular constituents or components and in particular to effect the removal of certain cations as in base exchange processes and to processes involving the absorption of gases and vapours by the employment of such resins.

As used herein the expression "methylene body" means formaldehyde itself or any of the bodies which may be regarded as the equivalents of formaldehyde in their reactivity with phenolic bodies in the production of resin-like products.

The present invention is based upon the observation that the employment of those resins formed by the condensation of polyhydric phenolic bodies and more particularly tannins alone or in association wtih monohydric phenols or their derivatives with methylene bodies, which have been subjected to the action of sulphur dioxide—sulphurous acid or—sulphites or have been obtained by the condensation with methylene bodies of phenolic bodies that have been previously treated with sulphiting agents or have been formed from reaction mixtures to which agents have been added or which fall within any combination of such categories gives rise to certain advantages, more particularly in connection with the employment of the resins in base exchange processes.

Certain of the tannins referred to in the British specification in question are sulphited as a matter of their ordinary commercial preparation for tanning purposes.

In so far as the invention is concerned with the products formed by the condensation with formaldehyde of such sulphited tannins the invention includes the use of condensation products of such tannins which have been further sulphited whereby an increased degree of sulphiting of the final product is secured, or by the addition of sulphiting agents to the reaction mixture or the treatment of the initial reaction products that is, the resin in the A stage with sulphiting agents is of advantage.

Thus in accordance with the invention there may be used (a) synthetic resin formed by the condensation with methylene bodies and more especially formaldehyde or hexamethylenetetramine of polyhydric phenolic bodies and more particularly tannins alone or in association with monohydric phenolic bodies which resins have been sulphited; (b) synthetic resins which have been obtained from phenolic bodies that have been sulphited; (c) synthetic resins which have been formed from reaction mixtures to which sulphiting agents have been added, and (d) synthetic resins which fall within any combination of such categories.

In all cases, in accordance with the invention, the synthetic resins are sulphited to a degree such that their sulphur content is not less than 2.4% whereby the NaCl value will be not less than 11.

The invention consists therefore in the process of treating fluids with synthetic resins obtained in the manners defined in the preceding paragraph for effecting the absorption or adsorption of particular constituents or components and in particular to effect the removal of certain cations in the case of the treatment of liquids as in base exchange processes and in processes involving the absorption of gases and vapours.

Among the materials that are particularly suited for the preparation of resins which may be used for the purposes of absorption or adsorption are commercial sulphited quebracho, mimosa or black wattle, hemlock, gambier, urunday, mangrove and Indian cutch, and phenols such as catechol, resorcinol, quinol and gambier catechin.

The general small-scale procedure for making the resins is as follows:

100 gm. of the tannin or polyhydric phenol are dissolved in 100–200 cc. of water and are heated on the steam bath or refluxed for about 8 hours with 30 gm. of sodium sulphite crystals or sodium metabisulphite or an equivalent quantity of sodium bisulphite liquor or mixtures of these in any proportion. The heating may be for a shorter or longer time at lower or higher temperatures and at ordinary or increased pressures or in an inert atmosphere if so desired.

The concentration of the reacting materials may also be varied within wide limits. To the resulting solution 40 per cent. solution of formaldehyde is added, generally about 50 cc. but amounts as low as 25 cc. are sometimes sufficient and heating is continued until gelatinisation takes place. After drying, the material is ground and sieved.

In addition to the above described methods of sulphiting the materials may be sulphited by solution or suspension in water or alkaline solution and by-passing in gaseous sulphur-dioxide.

Furthermore, the sulphiting may as previously stated be effected by the introduction of sulphites or sulphur-dioxide into the mixture of a formaldehyde solution and polyhydric phenolic bodies or the resins obtained by the condensation of polyhydric phenolic bodies with formaldehyde may be subjected to a sulphiting treatment or any combinations of these methods of sulphiting may be resorted to.

Acid or alkaline catalysts may be used but these are not necessary as shown in the following table which illustrates typical materials prepared in accordance with this invention and the results secured by their use.

| Polyhydric phenolic body | Composition of reaction mixture in parts by weight ||||| NaCl figure | Remarks on treated water |
| --- | --- | --- | --- | --- | --- | --- | --- |
| | Phenolic body | $H_2O$ | $Na_2SO_3.7H_2O$ | $CH_2O$ | Catalyst | | |
| Catechin | 100 | 200 | 30 | 50 | None | 22.6 | Almost colourless. |
| Liquid hemlock | 200 | | 30 | 50 | do | 19.3 | Slightly coloured. |
| Liquid mimosa | 200 | | 30 | 50 | do | 29.0 | Coloured. |
| Mangrove | 100 | 100 | 30 | 50 | do | 21.9 | |
| Quebracho | 100 | 200 | 60 | 50 | 20 c. c. conc. HCl | 32.7 | Almost colourless. |
| Do | 900 | 1800 | 350 | 400 | 25 c. c. 10N. NaOH | 26.0 | Slightly coloured. |
| Commercial sulphited quebracho | 100 | 100 | | 50 | None | 11.0 | Colourless. |
| Resorcinol | 100 | 750 | 20 and 20g. $Na_2S_2O_5$ | 50 | do | 30.0 | Slightly coloured. |

The resins referred to in the above table were prepared in accordance with the general example given above, the proportions of the essential reagents and catalyst in the reacting mixture being, however, as stated in the table.

The remarks in the last column of the table apply to the first runnings of the treated water. After about six successive runs it was found that whatever was soluble in the resin had almost entirely disappeared and the water was colourless.

The column headed "NaCl figure" represents the comparative cationic activity of the resins. The "NaCl figure" represents the number of cc. of N-caustic soda to neutralise the free acidity in the filtrate after passing about 200 cc. of N/4 solution of sodium chloride through 40 cc. of the resins, sieved through a 40 and retained on a 60 mesh. These resins may be used in conjunction with the basic resins described in British Patent application No. 32635/34.

As will be understood in the process of treating fluids with resins in accordance with the invention the fluids are caused to flow in contact with the resins, being for instance passed through a bed or body thereof in a granular form.

Thus in using the resins for removing cations for the purposes of base exchange the liquid will be caused to filter or percolate through a mass of the resins in granular form and generally in conditions facilitating the treatment of the resins after they have been in use an appropriate time in order to effect the substitution of the cation taken up by another cation.

Having now described my invention, what I claim as new and desire to secure by Letters Patent is:

1. The process of treating a fluid for the removal of undesired constituents which comprises contacting the fluid with a synthetic resin of the phenol-formaldehyde type which is sulphited to a degree that its sulphur content is not less than 2.4 per cent.

2. The process of treating a liquid for the removal of certain cations as in base exchange processes, which comprises contacting the liquid with a synthetic resin of the polyhydric phenol-formaldehyde type which is sulphited to a degree such that its sulphur content is not less than 2.4 per cent.

3. The process of treating a liquid for the removal of certain cations as in base exchange processes, which comprises contacting the liquid with a synthetic resin of the tannin-formaldehyde type which is sulphited to a degree such that its sulphur content is not less than 2.4 per cent.

4. The process of treating a liquid for the removal of certain cations as in base exchange processes, which comprises contacting the liquid with a synthetic resin of the tannin-formaldehyde type which in the course of its production is sulphited to a degree such that the sulphur content of the resin is not less than 2.4 per cent.

5. The process of treating a liquid for the removal of certain cations as in base exchange processes, which comprises contacting the liquid with a synthetic resin of the tannin-formaldehyde type, formed in the presence of a large proportion of sulphite ions, and which is thereby sulphited to a degree such that the sulphur content of the resin is not less than 2.4 per cent.

6. The process of treating a fluid for the removal of undesired constituents which comprises contacting the fluid with a synthetic resin of the monohydric and polyhydric phenol-formaldehyde type which is sulphited to a degree that its sulfur content is not less than 2.4%.

ERIC LEIGHTON HOLMES.